UNITED STATES PATENT OFFICE.

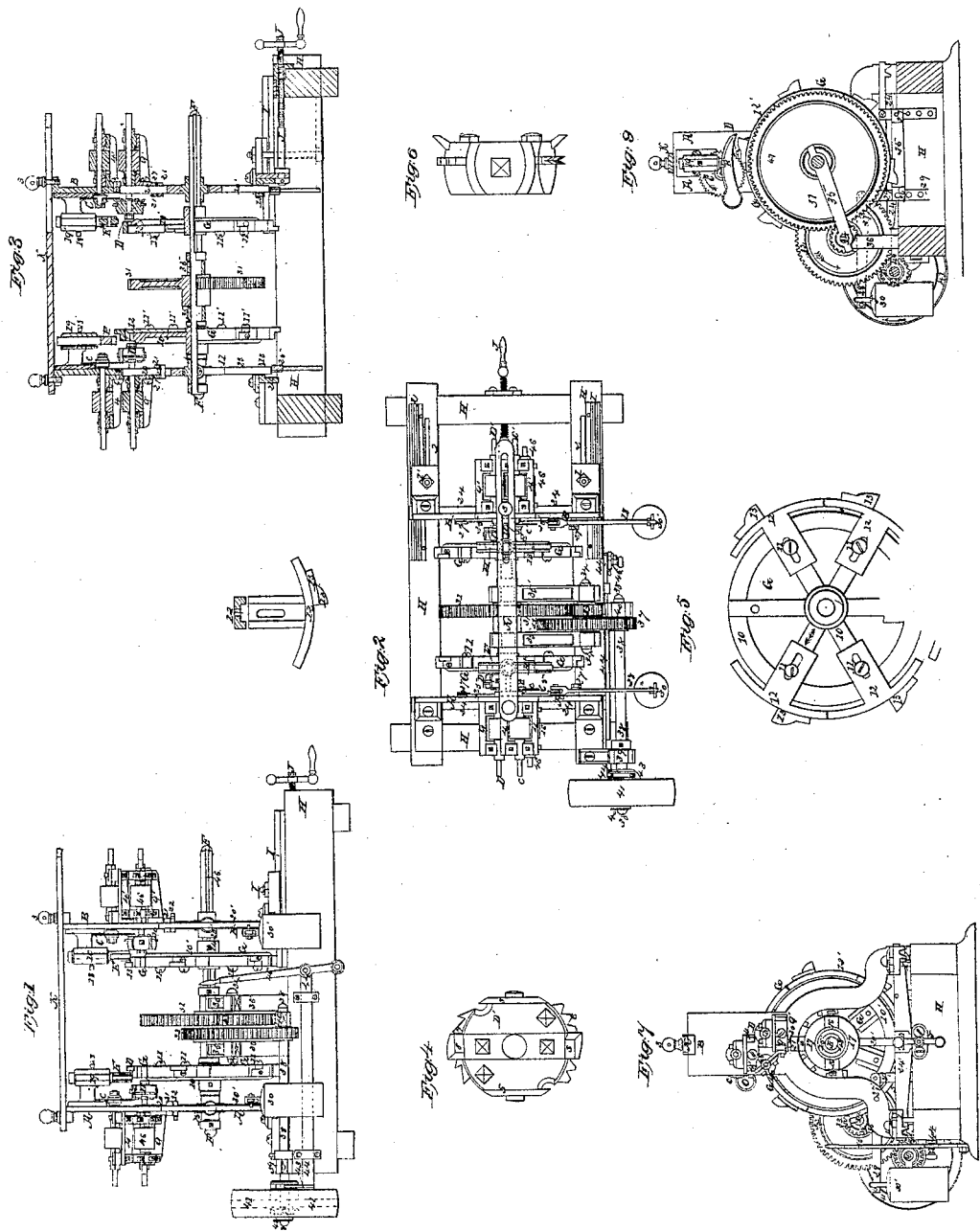

JONATHAN E. WARNER, OF BOSTON, MASSACHUSETTS.

MACHINE FOR FINISHING THE ENDS OF STAVES.

Specification of Letters Patent No. 10,242, dated November 15, 1853.

*To all whom it may concern:*

Be it known that I, JONATHAN E. WARNER, of Boston, in the county of Suffolk and State of Massachusetts, have invented a new and useful Machine for Finishing the Ends of Staves, which I denominate a "Working-Off Machine;" and I do hereby declare that the following is a full, clear, and exact description of the construction and operation of the same, reference being had to the accompanying drawings, making a part of this specification, in which—

Figure I is a longitudinal elevation: Fig. III a longitudinal section: Fig. V a ground plan; Fig. VII an end elevation; Fig. IX a transverse section; Fig. VIII a detached elevation of the rotary feed bed; Fig. II an elevation and section of one of the segments of Fig. VIII; Fig. IV a detached and enlarged view of the cutter head, and Fig. VI an end elevation of Fig. IV; similar letters and figures referring to similar parts in each of the figures.

The object of this invention is to finish the two ends of a stave simultaneously, which includes the distinct operations of cutting the staves to the proper length; beveling the ends; reducing the ends to the required thickness or "howeling"; and cutting the groove within which the edges of the head are to rest, or "crozing." The four combined operations are technically known as "working off," and are usually performed after the cask is "set-up," and by hand labor, to avoid which is the object of the machine invented by your petitioner.

The nature of my invention consists, first, in the use of circular saws to cut the staves to equal lengths: secondly, in the use of revolving cutter heads having in each, three sets of movable and adjustable cutters, the first set for forming the bevel on the ends of the staves; the second set for equaling the thickness of the staves at each end; and the third set for cutting the grooves for the heads: thirdly in the use of a rotary bed which, slowly revolving on its axis, carries the staves to the saws and cutters, and deposits them when finished on the opposite side of the machine. This bed is made to yield to the varying thickness of the staves, and by means of weights, the staves, while being wrought, are kept steadily in contact with fixed stops.

To enable others skilled in the art to make and use my invention, I will proceed to describe its construction and operation.

In the accompanying drawings A and B represent two upright frames for supporting the arbors of the circular saws C and C', the cutter heads D and D', the stops E and E', and the axis F of the rotary bed G; the one, A, being firmly bolted to the bed H, and the other B, admitting of motion laterally on the guides I and I' attached to the bed H, by means of the screw J, and secured at any given distance from A by the bolts 1 and 1' which pass downward through the slots 2 and 2' in the bed H. The tops of the frames are steadied by the horizontal link K, which is fast at A, and slotted, as seen in Fig. V, to permit the bolt 3, in the top of the frame B, to move therein. By tightening the bolt 3, the top of B, is connected firmly to A.

The saws C and C' are of the ordinary circular kind, and are supported in the brackets 4 and 4' which are bolted to A, and B.

To the cutter heads D and D' (shown detached and enlarged in Figs. IV and VI) are bolted the curved edge or howeling cutters 5 and 5', the gage cutters 6 and 6', the crozing saws 7 and 7', and the inclined cutters 8, 8 and 8', 8', which, severally, reduce the thickness of the stave at the ends; define the limits of, and cut the grooves for the heads; and bevel the ends of the stave. These heads are attached to revolving arbors, and supported in brackets 9 and 9' in the same manner as the saws C and C'.

To obtain a simple, uniform, and constant feeding apparatus, and also to combine therewith the means of so carrying the staves that the form of the surface left by the revolving cutters in the heads D and D' should be similar to the required internal figure of the ends of the cask, I have devised the rotary yielding, and expanding bed G, which is shown detached and enlarged in Fig. VIII. It consists of two similar wheels 10 and 10', to the radial arms of which are attached by the bolts 11 and 11', the movable segment 12 and 12'. Each segment carries a stop 13, against which the staves rest. By moving the segments on the radial arms the diameter of the bed may be made similar to the required internal diameter of the head of the cask. The two wheels are placed upon a shaft F, the one, 10, being fixed, and the other 10′ movable, and held at any required distance from 10, by the screw 14, which is guided by the groove 48 in the shaft F, and retains the opposite stops 13 and 13′ (Fig. 1) of the segments always in a position parallel with the axis F, and at right angles with the saws and cutter heads. The shaft F, is supported and revolved in the bearings 15 and 15′ within the frames A and B. These bearings are of the kind known as "swivel bearings," and vibrate on the screws 16 and 16′ as seen in Fig. VII, within the rings 17 and 17′. Above the rotary bed and in a vertical line with the axis F, are placed the spindles of the curved stops E, E′, which can be set at any vertical distance from the path of the cutters in the heads D and D′, which the required thickness of the stave demands, by means of the screws 18 and 18′ which pass through the shells of the sockets 19 and 19′. These sockets are bolted to the frames A and B as seen in Figs. I, II, V, and IX. The axis of the rotary bed has a yielding vertical movement, so that when a stave is carried by the revolving bed to the saws and cutters, in passing under the curved stops E and E′, the axis lowers to suit the thickness of each end of the stave. The mechanism by which the axis is made to yield to the inequalities is best seen in Figs. III, V, VII and IX; to the opposite sides of the rings 17 and 17′ are fixed the spindles 20 and 20′, Figs. III and VII—the upper ones, 20, pass through the eyes 21 and 21′ in the frames A and B, and have collars 22 and 22′, movable upon them to prevent the axis from being raised too high; the lower ends of the spindles 20′ slide through the eyes 23 and 23′, Fig. III, of the stretches 24 and 24′, and rest on the horizontal levers 25 and 25′, Figs. III and IX.

25, Fig. IX, is one of a system of levers composed of the movable fulcrums 26 and 27, the fixed fulcrum 27′, the levers 25 and 28, and the link 29. To the levers 28 and 28′ are hung the weights 30 and 30′, by the gravity of which, acting through the system of levers, the axis of the rotary bed is raised until the collars 22 and 22′ strike the eyes 21 and 21′ or the passing stave pressed against the curved stops E and E′ prevents further vertical action.

The revolution of the bed is accomplished by a train of gearing, viz: 31, on the shaft F; 32 and 33 on the shaft 34, and kept in contact with the gear 31 by the radius bars 35 and 35′, the ends of the bars resting on the props, 36 and 36′, Fig. 1; and finally the pinion 37 on the shaft 38. The shaft 38 revolves in the bearings 39 and 40 and carries the loose pulley 41. The pulley 41 is thrown into connection with its shaft by pins on its face being brought in contact with similar pins or projections on the side of the circular plate 42 (seen in dotted lines in Fig. 1) said pulley being moved laterally on the shaft 38, in the usual manner by the fork 43 embracing a groove in the hub of the pulley, the shipper bar 44, and the lever 45.

To bring the machine into action the circular saws are first set to the required length of the staves by moving the frame B on its bed; the curved stops E and E′ are then sent to position as described; the saws and cutters are made to revolve by a belt which passes under the carrier pulleys 46 and 46′, over the pulleys on the saw arbors, and under the pulleys on the cutter head arbors, thence uniting with the other end over the main driving pulley; the loose pulley 41 is then thrown into gear by the clutch arrangements, and a rotary motion being given to the bed G, a stave laid upon the wheels 10 and 10′ of the bed G parallel with its axis F, will be carried by the stops 13 in the direction of the arrow 47, Fig. IX, under the stops E and E′ to the saws and cutters; the outer side of the stave being supported against the stops E and E′ by the action of the weights 30 and 30′ upon the revolving feed bed G; having passed from under the stops E and E′, the stave being unsupported, falls from the bed. Other staves are laid upon the bed as often as the several stops 13, 13′ &c. come around to the operator.

Although the rotary bed which I have shown in the drawings and described herein is the arrangement preferred by me for general use, still do not confine myself to its particular detail as described; for in some cases I may prefer to make several wheels of different diameters corresponding to different diameters of casks, any two of which of the same diameter may be put upon the shaft F in place of the expanding wheels.

I do not claim a feed bed revolving in fixed bearings as any novelty; but

What I claim as my invention and desire to secure by Letters Patent, is—

1. A feed bed revolving in bearings which are capable of being moved by weights, springs, or other means toward the beds or stops on which the back or outer side of the stave is supported; the extent of such movement depending upon the thickness of the staves operated on.

2. I also claim the combination of said feed bed with the saws, cutters, fixed stops, and movable frame, and what are substantially their equivalents, operating in the manner above described, for the purpose of finishing the ends of staves.

JONATHAN E. WARNER.

Witnesses:
JOSIAH P. COOKE,
JOHN T. HANCOCK.